United States Patent [19]
Klingelhofer

[11] Patent Number: 5,055,928
[45] Date of Patent: Oct. 8, 1991

[54] DIGITAL VIDEO FRAME RECORDER WITH VIDEO DISPLAY TEST PATTERN SIGNAL GENERATOR

[75] Inventor: Marc Klingelhofer, Fremont, Calif.

[73] Assignee: Sony Corporation of America, Park Ridge, N.J.

[21] Appl. No.: 507,367

[22] Filed: Apr. 10, 1990

[51] Int. Cl.⁵ ............................................. H04N 17/00
[52] U.S. Cl. ....................................... 358/139; 358/10
[58] Field of Search ........................... 358/139, 10, 903

[56] References Cited

U.S. PATENT DOCUMENTS

| | | | |
|---|---|---|---|
| 4,425,581 | 1/1984 | Schweppe et al. | 358/148 |
| 4,554,663 | 11/1985 | Pham van Cang | 358/139 X |
| 4,635,096 | 1/1987 | Morgan | 358/139 X |
| 4,772,948 | 9/1988 | Irvin | 358/139 |
| 4,780,755 | 10/1988 | Knierim | 358/10 |
| 4,816,897 | 3/1989 | Kanishi | 358/139 X |
| 4,893,925 | 1/1990 | Sweeney et al. | 358/139 |
| 4,956,707 | 9/1990 | Oakley et al. | 358/140 |

Primary Examiner—Victor R. Kostak
Attorney, Agent, or Firm—Philip M. Shaw, Jr.

[57] ABSTRACT

A digital video frame recorder which includes an internal video display test pattern signal generator constructed substantially from already existing circuitry and hardware. A microprocessor and read only memor ("ROM") and/or random access memory ("RAM") used for performing preprogrammed self-diagnostic testing upon the digital video frame recorder are additionally programmed so that the user can selectively enable the internal video display test pattern signal generator. The internally generated video display test pattern signal data is stored within the frame memory in memory locations not normally used for storage of externally sourced video data. The internally generated video display test pattern signal data can be generated by sequentially reading out preprogrammed video display test pattern signal data directly from the ROM or RAM, or by having the microprocessor execute preprogrammed instructions stored in the ROM or RAM and thereby compute the video display test pattern signal data directly.

15 Claims, 2 Drawing Sheets

DIGITAL VIDEO FRAME RECORDER WITH VIDEO DISPLAY TEST PATTERN SIGNAL GENERATOR

BACKGROUND OF THE INVENTION

1. Field of the Invention

The present invention relates to video signal recorders and more particularly to digital video frame recorders used for buffering digital video signal data on a frame-by-frame basis.

2. Description of the Related Art

Digital video frame recorders are commonly used in color graphics display systems having high resolution. Such display systems typically have an input for accepting externally generated digital video data which is buffered on a frame-by-frame basis and displayed on a RGB video monitor. Often provided is an internal diagnostic capability whereby simple, digital video test data is generated internally for the purposes of performing self-diagnostic testing of specific electronic subsystems within the graphics display system. An internal computer or controller is used to control the generation and use of simple, digital video test data bit patterns and to put to appropriate use the results of such self-testing.

Examples of such color graphics display systems having self-diagnostic testing capabilities can be found in Irvin, U.S. Pat. No. 4,772,948 and Knierim, U.S. Pat. No. 4,780,755. Described therein are color graphics display systems having self-diagnostic testing capabilities for testing electronic subsystem elements within the overall display system.

One common test often performed on all types of video display systems is that where an externally generated "standard" video display test pattern signal, such as "color bars," is inputted and displayed. Aside from providing an indication as to how well the electronic subsystems within the graphics display system are performing, such a test also provides an indication as to how well the visual subsystem, i.e., the actual visual display device, such as a picture tube, is performing. Because the performance of the actual visual display device is being tested, this type of test requires some form of visual observation (e.g., actual observation by the human user, or an optical image processor). Thus, the simple, internal self-diagnostic testing capabilities such as those disclosed in the aforementioned patents will not suffice. Rather, externally generated video display test pattern signals must be inputted, displayed and observed.

To perform this test, the normal video input signal is removed or otherwise decoupled (e.g., by physically disconnecting the cable or other media carrying the signal). A video display test pattern signal generator, several of which are known in the art, is then coupled to the video input of the graphics display system to provide a video display test pattern signal. The video image representing the inputted video display test pattern signal is then displayed and observed on the display device of the display system. When the test has been completed, the video display test pattern signal generator is removed or otherwise decoupled and the normal video input signal is once again coupled to the video input of the display system.

Typically, video display test pattern signal generators supply video display test pattern signals as analog video signals using a large amount of analog circuitry, or as digital video signals using digital circuitry. If digital video signals are supplied, the display test pattern signal can be applied directly to the input of the graphics display system. However, if analog video signals are supplied, they must first be digitized by way of an analog-to-digital converter. In either case, switching circuitry external to the graphics display system must be provided to switch between the video display test pattern signal and the normal video input signal, or alternatively, the user must manually switch the media (e.g., cables) carrying the input signals.

Accordingly, it would be desirable to have a digital video frame recorder having a built-in capability to generate video display test pattern signals. It would be further desirable to have a digital video frame recorder which generated such video display test pattern signals in the digital format already used by its existing electronic subsystems. It would be still further desirable to provide such a video display test pattern signal generation capability by using already existing circuitry or hardware, or by adding only minimally thereto.

SUMMARY OF THE INVENTION

In accordance with the present invention, there is provided in combination with a digital video frame recorder and display system a video display test pattern signal generator. The digital video frame recorder and display system is of the type which includes a microprocessor and read only memory ("ROM") and/or random access memory ("RAM") for providing self-diagnostic testing of internal electronic subsystems, as well as a frame memory and input and output video data buses.

A video display test pattern signal generator in accordance with the present invention comprises programming the microprocessor to selectively generate standard video display test pattern signals by reading out actual digital video display test pattern signal data stored in the ROM or RAM which represents selected standard video display test patterns. Alternatively, a video display test pattern signal generator in accordance with the present invention comprises of programming the ROM or RAM with digital data representing program instructions which are executed by the microprocessor, resulting in the computation of the digital video display test pattern signal data representing the selected standard video display test pattern.

Once the digital video display test pattern signal data has been read out from the ROM or RAM, or computed by the microprocessor, it is written into the frame memory via the input video data bus. When selected for display, this internally generated and stored video display test pattern signal data is read out from the frame memory and transferred to the display device via the output video data bus.

Thus, the digital video frame recorder in accordance with the present invention provides a built-in video display test pattern signal generator, thereby obviating a need for an external video display test pattern signal generator, along with the need for an external input video signal switch. Furthermore, a digital video frame recorder in accordance with the present invention provides a built-in video display test pattern signal generator with little or no increase in circuitry or hardware needed to support this feature.

A digital video frame recorder in accordance with the present invention advantageously uses already existing self-diagnostic testing circuitry and hardware within a high definition video display system to create the built-in capability to generate standard video display test pattern signals (e.g., color bars, multiburst, pulse and bar, linearity (ramp), and 10-step).

These and other objectives, features and advantages of the present invention will be readily understood upon consideration of the following detailed description of the invention and the accompanying drawings.

BRIEF DESCRIPTION OF THE DRAWINGS

Throughout the figures, corresponding elements therein are designated with like numerals.

DETAILED DESCRIPTION OF THE INVENTION

Figure 1:
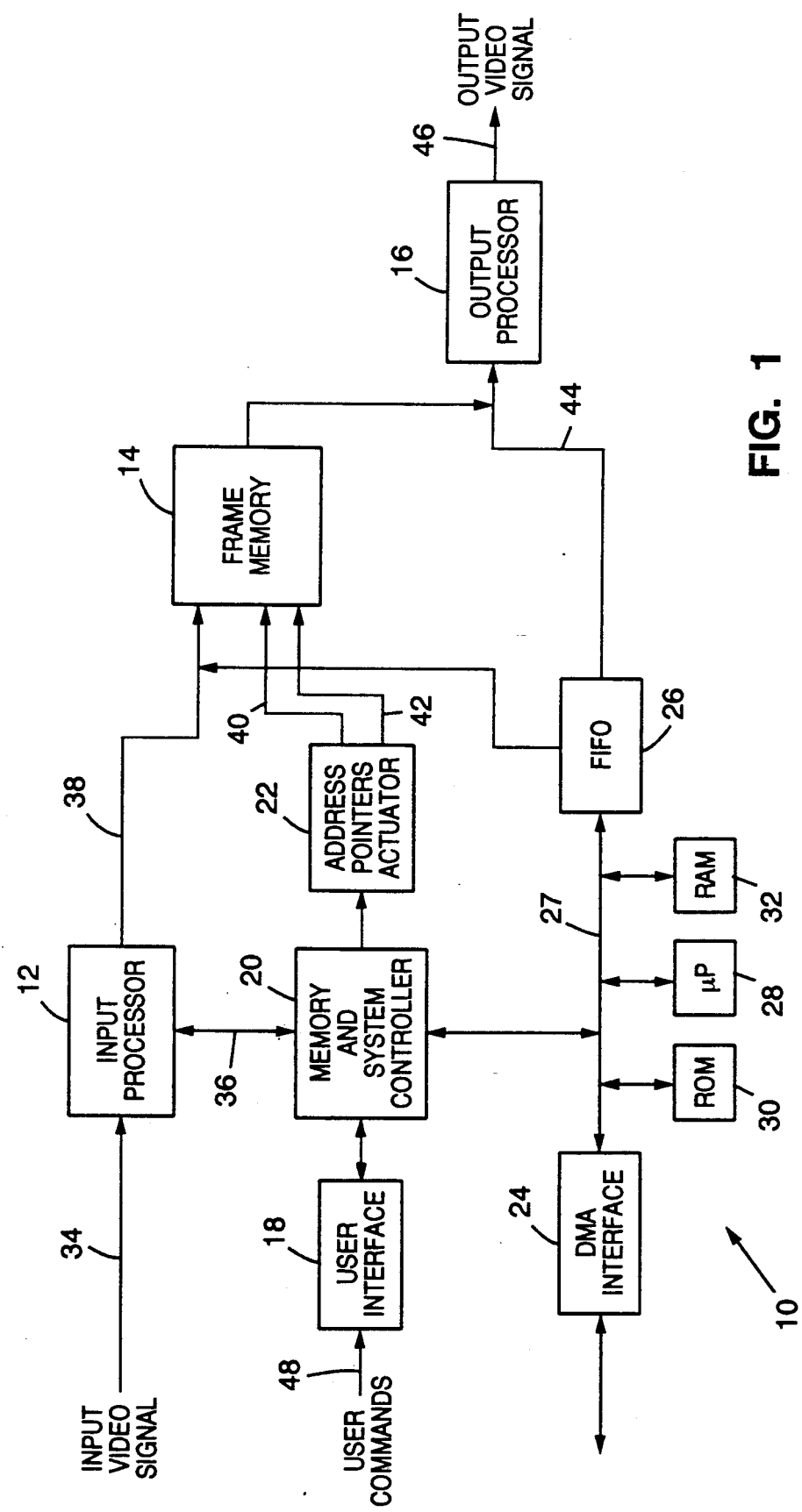
FIG. 1 illustrates in simplified block diagram form a digital video frame recorder incorporating a built-in video display test pattern signal generator in accordance with the present invention.

Referring to FIG. 1, a digital video frame recorder 10 in accordance with the present invention includes an input processor 12 for receiving an input video signal, a frame memory 14 supplied with the output of the input video processor 12 via an input video data bus 38, and an output processor 16 which is connected to receive the output of the frame memory 14 and which produces an output video signal 46. A user interface 18 receives user commands 48 and is connected to a memory and system controller 20. The memory and system controller 20 is connected to an address pointers actuator 22 and through a controller interface 36 to the input processor 12. A direct memory access ("DMA") interface 24, a first-in, first-out ("FIFO") register 26, a microprocessor 28, a read only memory ("ROM") 30, and a random access memory ("RAM") 32 are all connected together via a system bus 27. The FIFO register 26 is connected to the output processor 16 via an output video data bus 44 and is also connected to the input video data bus 38.

The input processor 12 can accept the input video signal 34 in analog or digital form. If the input video signal 34 is analog in form, it consists of analog red, green and blue ("RGB") video signals. If the input video signal 34 is digital in form, it consists of digital RGB video signals.

Alternatively, the input video signal 34 can consist of an analog composite video signal. If so, then the input processor 12 must include circuitry, well known and commonly used in the art, for filtering, stripping off the synchronization signals and converting the composite video signal to its RGB video signal equivalents. The synchronization signals are provided via the controller interface 36 to the memory and system controller 20 for use thereby (as explained more fully below).

The analog RGB video signals are digitized by analog-to-digital converters ("ADCs") included in the input processor 12. These digitized RGB video signals, or the input video signal 34 if received as digital RGB video signals, are transferred via the input video data bus 38 to the frame memory 14. This digitized video data is written into the frame memory 14 according to a write address pointer 40 received from the address pointers actuator 22 (as described more fully below).

The frame memory 14 includes three memory sections, or "planes," for storing the RGB video signal data. The digital video signal data corresponding to the red, green and blue signals are stored in the red, green and blue planes, respectively, within the frame memory 14. This stored, input video signal data is subsequently read out from the frame memory 14 according to a read address pointer 42 from the address pointers actuator 22 onto the output video data bus 44 for transfer to the output processor 16.

The output processor 16 prepares the digital video signal data to become the output video signal 46. If the output video signal 46 is to consist of digital RGB video signals, the output processor 16 will include appropriate digital buffers, such as buffers which convert the single-ended RGB video signals to balanced RGB video signals. If the output video signal 46 is to consist of analog RGB video signals, the output processor 16 includes digital-to-analog converters ("DACs") and appropriate filters for converting the digital RGB video signals to their analog RGB video signal equivalents. If the output video signal 46 is to be an analog composite video signal, the output processor 16 can further include the appropriate circuitry for combining the analog RGB video signals and constructing the analog composite video signal.

The memory and system controller 20 contains a programmable controller (not shown) which controls the basic functions of the frame recorder 10. According to preprogrammed instructions or user commands 48 received via the user interface 18, the memory and system controller 20 instructs the input processor 12 via the controller interface 36 to transfer input video signal data to the frame memory 14 via the input video data bus 38. The controller 20 further controls the address pointers actuator 22 which provides the write 40 and read 42 address pointers which control the writing and reading of video data into and out from, respectively, the frame memory 14. The controller 20 further controls the self-diagnostic testing performed by the microprocessor 28 (described more fully below). According to its preprogrammed instructions or user commands 48, the controller 20 controls the self-diagnostic testing performed by the microprocessor 28 or the bi-directional transfer of data via the DMA interface 24 (described more fully below).

The DMA interface 24 provides the necessary circuitry, well known and commonly used in the art, for supporting data transfers between the frame recorder 10 and an external host computer or image processing system (not shown). The DMA interface 24 provides direct memory access to the frame memory 14 via the system bus 27, FIFO register 26, and input 38 and output 44 video data buses.

The microprocessor 28, with its associated ROM 30 and RAM 32, performs the self-diagnostic testing of the frame recorder 10. When instructed by the memory and system controller 20, the microprocessor 28 transfers preprogrammed test data (from the ROM 30 or RAM 32) to the FIFO register 26. This test data is then written into and back out from the frame memory 14 via the input 38 and output 44 video data buses, respectively, and back into the FIFO register 26. By comparing this test data returning from the frame memory 14 with the original test data stored therein, the microprocessor 28 determines whether the frame memory 14 is functioning properly.

In accordance with the present invention, the microprocessor 28, ROM 30 and/or RAM 32 are further programmed to provide digital video display test pattern data representing standard video display test patterns. In a preferred embodiment of the present invention, the ROM 30 and/or RAM 32 are programmed with digital video display test pattern data representing standard video display test patterns. When instructed by the memory and system controller 20, the microprocessor 28 instructs the ROM 30 and/or RAM 32 to transfer this data to the FIFO register 26. From there the data is transferred to the frame memory 14 via the input video data bus 38. This digital video display test pattern data is stored within the frame memory 14 in memory locations not normally used for storing input video signal data received from the input processor 12 (as described above).

This digital video display test pattern data is then read out from the frame memory 14 onto the output video data bus 44 for transfer to the output processor. The output processor 16 then processes this data (as described above) and outputs it as the output video signal 46 for display on a visual display device, such as a picture tube. The ROM 30 and/or RAM 32 can be programmed with sufficient digital video display test pattern data to provide virtually any standard video display test pattern, such as color bars, multiburst, pulse and bar, linearity and 10-step.

In an alternate preferred embodiment of the present invention, the ROM 30 and/or RAM 32 is programmed with instructions for the microprocessor 28 for computing the digital video display test pattern signal data. The microprocessor 28 executes these instructions programmed in the ROM 30 and/or RAM 32, computing the digital video display test pattern data, and transfers this computed data to the FIFO register 26. This computed digital video display test pattern data is transferred to the frame memory 14 and subsequently processed by the output processor 16 as described above.

Figure 2:
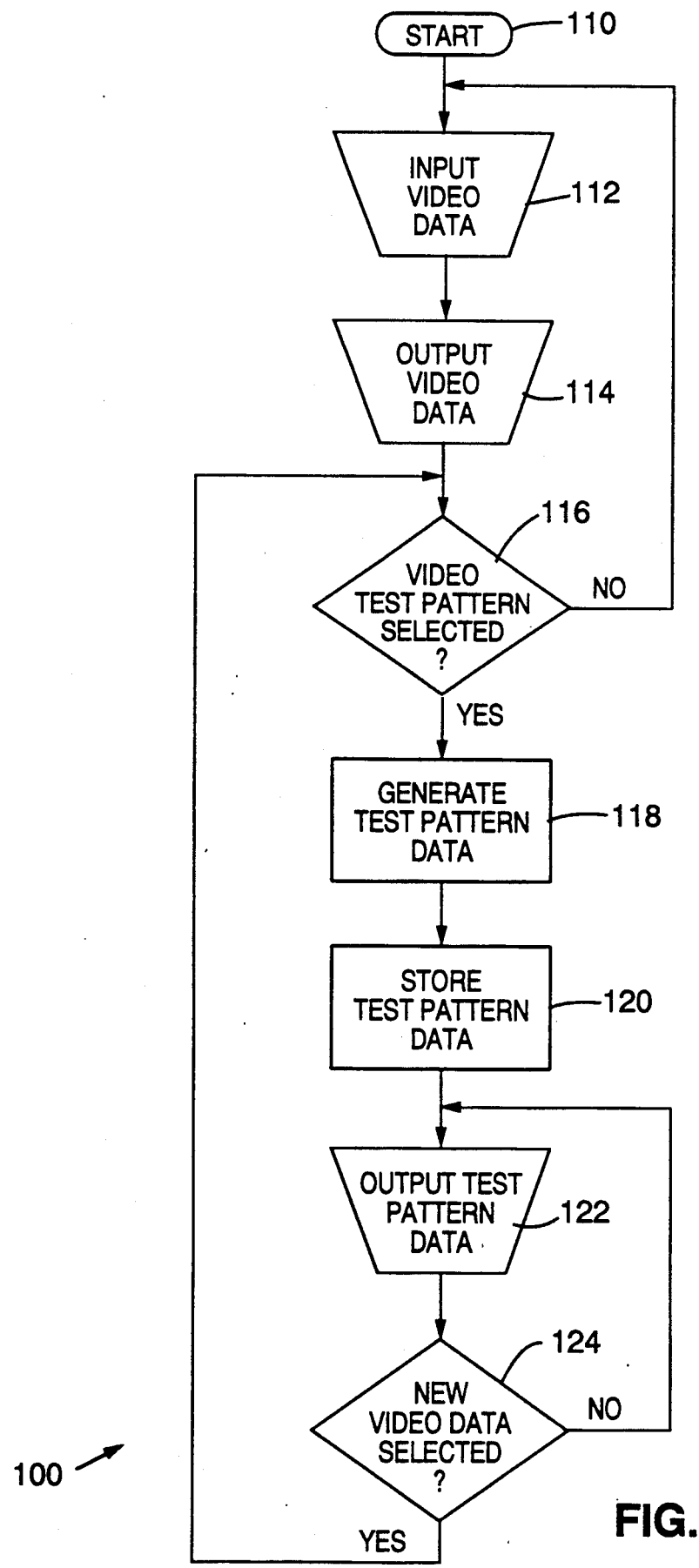
FIG. 2 illustrates in simplified flow chart form the operational steps of a digital video frame recorder programmed in accordance with the present invention.

FIG. 2 illustrates in simplified flow chart form the operational steps taken by a frame recorder 10 in accordance with the present invention, with such operational steps being translatable into appropriate software for the execution thereof. Following its start 110 (initiated per instructions from the memory and system controller 20, as described above), the frame recorder 10 performs the step 112 of inputting and storing the externally generated video signal data. As described above, this data is inputted via the input processor 12 and stored within the frame memory 14. The next step 114 is to output the stored input video signal data. As described above, the input video signal data stored within the frame memory 14 is outputted via the output processor 16 for display.

The next step 116 is to determine whether a video display test pattern has been selected for display. If so, the next step 118 is to begin generating the test pattern data therefor. If not, the prior steps 112, 114 of inputting, storing and outputting externally generated video signal data are repeated.

After the step 118 of generating the test pattern data (as described above), the next step 120 is to store the test pattern data within the frame memory 14. The following step 122 is to output the stored test pattern data via the output processor 16 for display. Once done, the next step 124 is to determine whether new video data has been selected for display. If not, then the step 122 of outputting the stored test pattern data for display is repeated.

However, if new video data has been selected for display, the next step 116 is to determine whether the newly selected video data is a video display test pattern. If so, then the step 118 of generating new test pattern data is performed. If not, that means that the newly selected video data is to be new externally generated video data. Thus, the step 112 of inputting new externally generated video signal data is performed.

As illustrated in FIG. 2, the operational steps can appear as sequential steps. However, as will be appreciated by one of ordinary skill in the art, some of these steps can in fact be executed simultaneously. For example, the steps 112, 114 of inputting, storing and outputting externally generated video signal data can be executed simultaneously. In other words, as input video signal data is being accepted for storage within the frame memory 14 via the input processor 12, previously stored video signal data can be outputted via the output processor 16 for display. Further, the steps 118, 120, 122 of generating, storing and outputting video display test pattern data can also be executed simultaneously.

For a still further example, the steps 112, 118, 120 of inputting and storing externally generated video signal data 34, and generating and storing video display test pattern signal data can be executed "quasi-simultaneously." That is, during the horizontal and/or vertical blanking of the input video signal 34, the video display test pattern signal data can be generated and stored in the frame memory.

As described above for FIG. 1, the step 118 wherein the video display test pattern data is generated can consist of either reading out test pattern data directly from the ROM 30 or RAM 32 or reading out computation instructions from the ROM 30 or RAM 32 for execution thereof by the microprocessor 28 to compare the test pattern data.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. An improved digital video signal recorder comprising a digital memory for storing inputted digital video signal data and a microprocessor programmed and coupled to generate and transfer digital test data to and from the digital memory, the improvement comprising:
   a read only memory coupled to the microprocessor and containing preprogrammed digital video test data representing standard video display test patterns, whereby the microprocessor reads out the digital video test data and transfers it to the digital memory.

2. An improved digital video signal recorder comprising a digital memory for storing inputted digital video signal data and a microprocessor programmed and coupled to generate and transfer digital test data to and from the digital memory, the improvement comprising:
   a read only memory coupled to the microprocessor and containing preprogrammed digital data representing instructions for execution by the microprocessor whereby the microprocessor computes, generates and transfers to the digital memory digital video display test pattern data representing standard video display test patterns.

3. A digital video signal recorder for recording digital video signal data, the digital video signal recorder comprising:
- an input video signal data port coupled to receive externally sourced digital input video signal data;
- video display test pattern signal generator means for programmably generating digital video display test pattern signal data representing predetermined video display test patterns;
- memory means for storing digital video signal data; and
- memory addressing means for addressing the memory means for writing and reading the digital input video signal data and digital video display test pattern signal data into and out from the memory means, respectively.

4. A digital video signal recorder as recited in claim 3, wherein the video display test pattern signal generator means comprises a read only memory containing preprogrammed digital video signal data representing the predetermined video display test patterns.

5. A digital video signal recorder as recited in claim 3, wherein the video display test pattern signal generator means comprises a read only memory containing preprogrammed digital data representing instructions for generating the digital video display test pattern signal data and a microprocessor coupled to receive and execute the instructions.

6. A digital video signal recorder as recited in claim 3, wherein the memory means comprises a random access memory.

7. A digital video signal recorder as recited in claim 3, wherein the memory addressing means comprises write and read address pointers and a controller therefor.

8. A method of operating a digital video signal data recorder, comprising the following steps:
- inputting externally sourced digital video signal data to a digital video signal data recorder having an electronic memory coupled to input and store therein externally sourced digital video signal data;
- storing the inputted digital video signal data in the electronic memory;
- internally generating digital video display test pattern data within the digital video signal data recorder; and
- storing the internally generated digital video display test pattern signal data in the electronic memory.

9. A method of operating a digital video signal data recorder as recited in claim 8, wherein the step of internally generating the digital video display test pattern signal data comprises sequentially reading out preprogrammed digital video display test pattern signal data from a read only memory.

10. A method of operating a digital video signal data recorder as recited in claim 8, wherein the step of internally generating the digital video display test pattern signal data comprises sequentially reading out preprogrammed digital video display test pattern signal data from a random access memory.

11. A method of operating a digital video signal data recorder as recited in claim 8, wherein the step of internally generating the digital video display test pattern signal data comprises electronically executing preprogrammed instructions stored in an electronic memory whereby the execution results in the computation and generation of the digital video display test pattern signal data.

12. A digital video signal recorder for recording digital video signal data, the digital video signal recorder comprising:
- an input video signal data port coupled to receive externally sourced digital input video signal data;
- a memory containing preprogrammed digital video signal data representing a predetermined video display test pattern;
- memory means for storing digital video signal data; and
- memory addressing means for addressing the memory means for writing and reading into and out from the memory means, respectively, the digital input video signal data and the digital video display test pattern signal data.

13. A digital video signal recorder for recording digital video signal data, the digital video signal recorder comprising:
- an input video signal data port coupled to receive externally sourced digital input video signal data;
- a memory containing preprogrammed digital data representing instructions for generating digital video signal data representing a predetermined video display test pattern;
- a microprocessor coupled to receive and execute the test pattern instructions;
- memory means for storing digital video signal data; and
- memory addressing means for addressing the memory means for writing and reading into and out from the memory means, respectively, the digital input video signal data and the digital video display test pattern signal data.

14. A method of operating a digital video signal data recorder, comprising the following steps:
- inputting externally sourced digital video signal data to a digital video signal data recorder having a display memory coupled to input and store therein externally sourced digital video signal data;
- storing the inputted digital video signal data in the display memory;
- reading out preprogrammed digital video signal data representing a predetermined video display test pattern from a test pattern data memory; and
- storing the read out digital video display test pattern signal data in the display memory.

15. A method of operating a digital video signal data recorder, comprising the following steps:
- inputting externally sourced digital video signal data to a digital video signal data recorder having a display memory coupled to input and store therein externally sourced digital video signal data;
- storing the inputted digital video signal data in the display memory;
- electronically executing preprogrammed instructions stored in an instructions memory, whereby the execution results in computation and generation of digital video signal data representing a predetermined video display test pattern; and
- storing the generated digital video display test pattern signal data in the display memory.

* * * * *